April 28, 1931.  A. DINA  1,802,709
PROJECTION MACHINE SHUTTER (COMB) FOR MOTION
PICTURES PROJECTION MACHINES
Filed Nov. 30, 1928

Inventor
Augusto Dina
By his Attorney
Howard W. Dix

Patented Apr. 28, 1931

1,802,709

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

PROJECTION-MACHINE SHUTTER (COMB) FOR MOTION-PICTURE-PROJECTION MACHINES

Application filed November 30, 1928. Serial No. 322,699.

This invention relates to shutters for picture projection machines, and particularly for use with motion picture projection machines, and has for an object to provide a simple and efficient shutter which in operation will produce the usual dissolving without an appreciable curtain effect, which in motion picture machines is sometimes present at slow speeds. In the motion picture projection machines, the undesirable flickering will result at low speeds. This flickering may be overcome by increased speed and/or by the invention herein described and defined.

When the ordinary shutter is employed in motion picture machines and is located in front of the projection head as has hitherto been customary, the so-called dissolving effect will be produced when the film is run at normal speed. When the same shutter is used behind the head, an effect as if a curtain were being drawn down across the film is produced when the film is run at a very slow speed. With the shutter of my present invention, whether used in front of or at the rear of the projection head, the above mentioned objectionable curtain effect at slow speeds of the film is substantially eliminated.

The invention, in brief, comprises providing the leading and trailing edges of the shutter blades with teeth to produce a comb effect which will be described more in detail hereinafter. It has been found that by providing these combed edges, the dissolving effect is produced at relatively slow speeds when the shutter is used in front of the projection head and that the curtain effect at slow speeds is substantially eliminated when the shutter of my invention is employed at the rear of the projection head. Further, with this improved type of shutter, all flickering is eliminated when the machine is run at normal speed and irrespective of whether the shutter is mounted in front or in the rear of the head.

Figure 1:
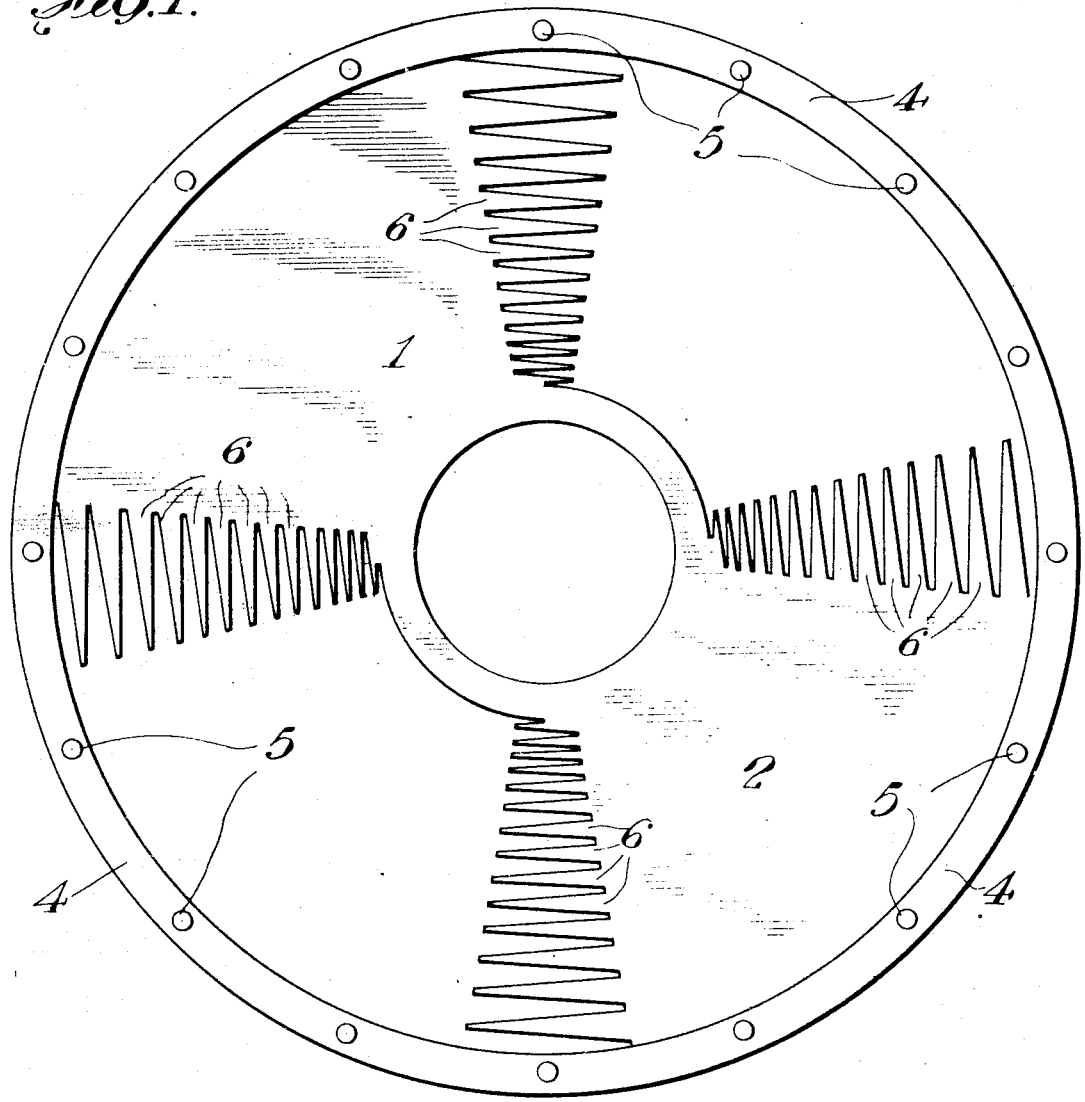
Figure 2:
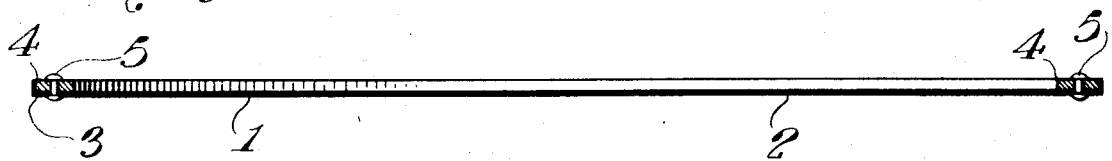

Further and more specific objects, features, and advantages will more clearly appear from the detailed description given below taken in connection with the accompanying drawings which form part of the specification, which illustrate one embodiment of the invention, and in which, Fig. 1 is an elevation of my improved shutter, and Fig. 2 is a cross section therethrough.

What is now considered to be the preferred form of the invention, comprises a pair of shutter blades 1 and 2 joined by a circular rim 3 and stiffened by a reinforcing band 4 attached thereto by rivets 5.

The lateral, or leading and trailing edges of the blades 1 and 2 are preferably provided with a series of teeth 6, or may be constructed in any other manner to produce the results herein set forth. The teeth 6 have been found to give very excellent results. The formation of the teeth is preferably irregular, that is to say, the length of the teeth may vary, or the shape of the teeth may be variable, or on the other hand the length and shape of the teeth may be uniform while the edge of the blade on which they are formed may be irregular. This irregularity is desirable and the particular form of it employed depends upon the conditions to be met. In the preferred form shown may the lengths of the teeth be considered as proportional to the distance they are disposed from the center of the shutter because the teeth further from the center sweep over a longer path than those nearer the center for any given angular velocity of the shutter.

This construction will permit the shutter to be run in either direction. When this type of shutter is employed in front of the projection head, as is usually the case, the machine may be run at very low speeds without any of the usual objectionable flickering effects. When this type of shutter is employed in the rear of the projection head, as is preferable for certain purposes such as keeping the film cool, the curtain effect above referred to is eliminated. Therefore it will be obvious that this shutter may be used in place of the ordinary shutters in any position relative to the projection head to eliminate the objectionable effects above described.

While the improvement has been described in detail and with respect to a preferred form thereof, it is not desired to be limited to such details of form, since many changes and modifications may be made and the invention embodied in other forms without departing from the spirit and scope of the invention in its broader aspects. Hence it is desired to cover all modifications and forms coming within the language and scope of any one or more of the appended claims.

What is claimed is:

1. A shutter for motion picture machines comprising a blade, a series of teeth on a lateral edge of said blade, the length of said teeth being proportional to the distance of the teeth from the center of the shutter.

2. A shutter for motion picture machines comprising a blade, a series of teeth on the leading and trailing edges of said blade, the length of the teeth being proportional to the distance of the teeth from the center of the shutter.

3. A shutter for motion picture machines comprising a plurality of blades disposed in a balanced relation and having leading and trailing edges, a series of teeth along said edges, the length of the teeth being proportional to the distance of the teeth from the center of the shutter.

4. A shutter for motion picture machines comprising a plurality of blades disposed in a balanced relation and having leading and trailing edges, a series of teeth along said edges, the length of the teeth increasing as the distance of the teeth from the center of the shutter increases, and an annular guard connecting the outer edges of the blades.

5. A shutter for motion picture machines comprising a plurality of blades disposed in a balanced relation and having leading and trailing edges, a series of teeth along said edges, the length of the teeth being proportional to the distance of the teeth from the center of the shutter, and an annular guard connecting the outer edges of the blades.

AUGUSTO DINA.